United States Patent
Cummings et al.

(10) Patent No.: US 7,289,256 B2
(45) Date of Patent: Oct. 30, 2007

(54) ELECTRICAL CHARACTERIZATION OF INTERFEROMETRIC MODULATORS

(75) Inventors: William J. Cummings, San Francisco, CA (US); Brian Gally, San Rafael, CA (US); Manish Kothari, Cupertino, CA (US)

(73) Assignee: IDC, LLC, San Francisco, CA (US)

( * ) Notice: Subject to any disclaimer, the term of this patent is extended or adjusted under 35 U.S.C. 154(b) by 0 days.

(21) Appl. No.: 11/097,511

(22) Filed: Apr. 1, 2005

(65) Prior Publication Data

US 2006/0077523 A1    Apr. 13, 2006

Related U.S. Application Data

(60) Provisional application No. 60/613,537, filed on Sep. 27, 2004.

(51) Int. Cl.
G02B 26/00  (2006.01)
(52) U.S. Cl. .................. 359/238; 359/290; 359/237
(58) Field of Classification Search ................ 359/237, 359/238, 295, 298, 290
See application file for complete search history.

(56) References Cited

U.S. PATENT DOCUMENTS

| | | |
|---|---|---|
| 2,534,846 A | 12/1950 | Ambrose et al. |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,813,265 A | 5/1974 | Marks |
| 3,899,295 A | 8/1975 | Halpem et al. |
| 3,955,880 A | 5/1976 | Lierke |
| 4,001,808 A | 1/1977 | Ebihara et al. |
| 4,099,854 A | 7/1978 | Decker et al. |
| 4,224,565 A | 9/1980 | Sosniak et al. |
| 4,228,437 A | 10/1980 | Shelton |
| 4,377,324 A | 3/1983 | Durand et al. |

(Continued)

FOREIGN PATENT DOCUMENTS

CH    685887 A5    10/1995

(Continued)

OTHER PUBLICATIONS

Dokmeci, et al. A High-Sensitivity Polyimide Capacitive Relative Humidity Sensor for Monitoring Anodically Bonded Hermetic Micropackages Journal of Microelectromechanical Systems, vol. 10, No. 2, Jun. 2001, 197-204.

(Continued)

*Primary Examiner*—Timothy Thompson
*Assistant Examiner*—Jerry Fang
(74) *Attorney, Agent, or Firm*—Knobbe, Martens, Olson & Bear, LLP

(57) ABSTRACT

Disclosed herein are methods and systems for testing the electrical characteristics of reflective displays, including interferometric modulator displays. In one embodiment, a controlled voltage is applied to conductive leads in the display and the resulting current is measured. The voltage may be controlled so as to ensure that interferometric modulators do not actuate during the resistance measurements. Also disclosed are methods for conditioning interferometric modulator display by applying a voltage waveform that causes actuation of interferometric modulators in the display.

19 Claims, 9 Drawing Sheets

U.S. PATENT DOCUMENTS

| | | |
|---|---|---|
| 4,389,096 A | 6/1983 | Hori et al. |
| 4,403,248 A | 9/1983 | te Velde |
| 4,441,791 A | 4/1984 | Hornbeck |
| 4,445,050 A | 4/1984 | Marks |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,897,360 A | 1/1990 | Guckel et al. |
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,175,772 A | 12/1992 | Kahn et al. |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,296,950 A | 3/1994 | Lin et al. |
| 5,305,640 A | 4/1994 | Boysel et al. |
| 5,307,139 A | 4/1994 | Tyson, II et al. |
| 5,311,360 A | 5/1994 | Bloom et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,409 A | 10/1995 | Henley |
| 5,459,602 A | 10/1995 | Sampsell |
| 5,459,610 A | 10/1995 | Bloom et al. |
| 5,461,411 A | 10/1995 | Florence et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoads et al. |
| 5,619,366 A | 4/1997 | Rhoads et al. |
| 5,636,052 A | 6/1997 | Arney et al. |
| 5,646,768 A | 7/1997 | Kaeriyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,703,710 A | 12/1997 | Brinkman et al. |
| 5,710,656 A | 1/1998 | Goossen |
| 5,729,245 A | 3/1998 | Gove et al. |
| 5,739,945 A | 4/1998 | Tayebati |
| 5,745,193 A | 4/1998 | Urbanus et al. |
| 5,745,281 A | 4/1998 | Yi et al. |
| 5,771,116 A | 6/1998 | Miller et al. |
| 5,784,190 A | 7/1998 | Worley |
| 5,784,212 A | 7/1998 | Hornbeck |
| 5,818,095 A | 10/1998 | Sampsell |
| 5,825,528 A | 10/1998 | Goossen |
| 5,835,255 A | 11/1998 | Miles |
| 5,842,088 A | 11/1998 | Thompson |
| 5,912,758 A | 6/1999 | Knipe et al. |
| 5,986,796 A | 11/1999 | Miles |
| 6,028,690 A | 2/2000 | Carter et al. |

| | | | | | | |
|---|---|---|---|---|---|---|
| 6,038,056 | A | 3/2000 | Florence et al. | 6,958,847 | B2 | 10/2005 | Lin |
| 6,040,937 | A | 3/2000 | Miles | 2001/0003487 | A1 | 6/2001 | Miles |
| 6,049,317 | A | 4/2000 | Thompson et al. | 2002/0015215 | A1 | 2/2002 | Miles |
| 6,055,090 | A | 4/2000 | Miles | 2002/0054424 | A1 | 5/2002 | Miles |
| 6,061,075 | A | 5/2000 | Nelson et al. | 2002/0075555 | A1 | 6/2002 | Miles |
| 6,088,474 | A | 7/2000 | Dudasko et al. | 2002/0126364 | A1 | 9/2002 | Miles |
| 6,099,132 | A | 8/2000 | Kaeriyama | 2002/0157033 | A1 | 10/2002 | Cox |
| 6,113,239 | A | 9/2000 | Sampsell et al. | 2002/0171636 | A1* | 11/2002 | Aarts et al. .................. 345/177 |
| 6,147,790 | A | 11/2000 | Meier et al. | 2003/0016361 | A1 | 1/2003 | Geradus et al. |
| 6,160,833 | A | 12/2000 | Floyd et al. | 2003/0043157 | A1 | 3/2003 | Miles |
| 6,180,428 | B1 | 1/2001 | Peeters et al. | 2003/0063081 | A1 | 4/2003 | Kimura et al. |
| 6,201,633 | B1 | 3/2001 | Peeters et al. | 2003/0072070 | A1 | 4/2003 | Miles |
| 6,232,936 | B1 | 5/2001 | Gove et al. | 2003/0077881 | A1 | 4/2003 | Gelmi Ilaria et al. |
| 6,282,010 | B1 | 8/2001 | Sulzbach et al. | 2003/0112231 | A1 | 6/2003 | Kurumisawa |
| 6,285,207 | B1 | 9/2001 | Listwan | 2003/0202264 | A1 | 10/2003 | Weber et al. |
| 6,295,154 | B1 | 9/2001 | Laor et al. | 2003/0202265 | A1 | 10/2003 | Reboa et al. |
| 6,323,982 | B1 | 11/2001 | Hornbeck | 2003/0202266 | A1 | 10/2003 | Ring et al. |
| 6,347,009 | B1 | 2/2002 | Takeuchi | 2003/0218462 | A1* | 11/2003 | Dick et al. .................. 324/502 |
| 6,407,560 | B1 | 6/2002 | Walraven et al. | 2004/0004610 | A1 | 1/2004 | Iwami et al. |
| RE37,847 | E | 9/2002 | Henley et al. | 2004/0027636 | A1 | 2/2004 | Miles |
| 6,447,126 | B1 | 9/2002 | Hornbeck | 2004/0042000 | A1* | 3/2004 | Mehri et al. ................. 356/218 |
| 6,465,355 | B1 | 10/2002 | Horsley | 2004/0051929 | A1 | 3/2004 | Sampsell et al. |
| 6,466,358 | B2 | 10/2002 | Tew | 2004/0057043 | A1 | 3/2004 | Newman et al. |
| 6,473,274 | B1 | 10/2002 | Maimone et al. | 2004/0058532 | A1 | 3/2004 | Miles et al. |
| 6,480,177 | B2 | 11/2002 | Doherty et al. | 2004/0070400 | A1 | 4/2004 | van Spengen |
| 6,496,122 | B2 | 12/2002 | Sampsell | 2004/0080807 | A1 | 4/2004 | Chen et al. |
| 6,545,335 | B1 | 4/2003 | Chua et al. | 2004/0125281 | A1 | 7/2004 | Lin et al. |
| 6,548,908 | B2 | 4/2003 | Chua et al. | 2004/0145049 | A1 | 7/2004 | McKinnell et al. |
| 6,549,338 | B1 | 4/2003 | Wolverton et al. | 2004/0145811 | A1 | 7/2004 | Lin et al. |
| 6,552,840 | B2 | 4/2003 | Knipe | 2004/0147056 | A1 | 7/2004 | McKinnell et al. |
| 6,567,715 | B1 | 5/2003 | Sinclair et al. | 2004/0147198 | A1 | 7/2004 | Lin et al. |
| 6,574,033 | B1 | 6/2003 | Chui et al. | 2004/0160143 | A1 | 8/2004 | Shreeve et al. |
| 6,589,625 | B1 | 7/2003 | Kothari et al. | 2004/0174583 | A1 | 9/2004 | Chen et al. |
| 6,600,201 | B2 | 7/2003 | Hartwell et al. | 2004/0175577 | A1 | 9/2004 | Lin et al. |
| 6,606,175 | B1 | 8/2003 | Sampsell et al. | 2004/0179281 | A1 | 9/2004 | Reboa |
| 6,625,047 | B2 | 9/2003 | Coleman, Jr. | 2004/0206953 | A1 | 10/2004 | Morena et al. |
| 6,630,786 | B2 | 10/2003 | Cummings et al. | 2004/0207897 | A1 | 10/2004 | Lin |
| 6,632,698 | B2 | 10/2003 | Ives | 2004/0209192 | A1 | 10/2004 | Lin et al. |
| 6,643,069 | B2 | 11/2003 | Dewald | 2004/0209195 | A1 | 10/2004 | Lin |
| 6,650,455 | B2 | 11/2003 | Miles | 2004/0212026 | A1 | 10/2004 | Van Brocklin et al. |
| 6,666,561 | B1 | 12/2003 | Blakley | 2004/0217378 | A1 | 11/2004 | Martin et al. |
| 6,674,090 | B1 | 1/2004 | Chua et al. | 2004/0217919 | A1 | 11/2004 | Pichl et al. |
| 6,674,562 | B1 | 1/2004 | Miles | 2004/0218251 | A1 | 11/2004 | Piehl et al. |
| 6,680,792 | B2 | 1/2004 | Miles | 2004/0218334 | A1 | 11/2004 | Martin et al. |
| 6,710,908 | B2 | 3/2004 | Miles et al. | 2004/0218341 | A1 | 11/2004 | Martin et al. |
| 6,741,377 | B2 | 5/2004 | Miles | 2004/0227493 | A1 | 11/2004 | Van Brocklin et al. |
| 6,741,384 | B1 | 5/2004 | Martin et al. | 2004/0240032 | A1 | 12/2004 | Miles |
| 6,741,503 | B1 | 5/2004 | Farris et al. | 2004/0240138 | A1 | 12/2004 | Martin et al. |
| 6,747,785 | B2 | 6/2004 | Chen et al. | 2004/0245588 | A1 | 12/2004 | Nikkel et al. |
| 6,747,800 | B1 | 6/2004 | Lin | 2004/0262604 | A1* | 12/2004 | Lee ............................ 257/48 |
| 6,750,152 | B1 | 6/2004 | Christenson et al. | 2004/0263944 | A1 | 12/2004 | Miles et al. |
| 6,753,528 | B1 | 6/2004 | Nikoonahad et al. | 2005/0001828 | A1 | 1/2005 | Martin et al. |
| 6,775,174 | B2 | 8/2004 | Huffman et al. | 2005/0003667 | A1 | 1/2005 | Lin et al. |
| 6,778,155 | B2 | 8/2004 | Doherty et al. | 2005/0024557 | A1 | 2/2005 | Lin |
| 6,794,119 | B2 | 9/2004 | Miles | 2005/0035699 | A1 | 2/2005 | Tsai |
| 6,811,267 | B1 | 11/2004 | Allen et al. | 2005/0036095 | A1 | 2/2005 | Yeh et al. |
| 6,819,469 | B1 | 11/2004 | Koba | 2005/0036192 | A1 | 2/2005 | Lin et al. |
| 6,822,628 | B2 | 11/2004 | Dunphy et al. | 2005/0038950 | A1 | 2/2005 | Adelmann |
| 6,824,739 | B1 | 11/2004 | Arney et al. | 2005/0042117 | A1 | 2/2005 | Lin |
| 6,829,132 | B2 | 12/2004 | Martin et al. | 2005/0046922 | A1 | 3/2005 | Lin et al. |
| 6,853,129 | B1 | 2/2005 | Cummings et al. | 2005/0046948 | A1 | 3/2005 | Lin |
| 6,855,610 | B2 | 2/2005 | Tung et al. | 2005/0057442 | A1 | 3/2005 | Way |
| 6,859,218 | B1 | 2/2005 | Luman et al. | 2005/0068583 | A1 | 3/2005 | Gutkowski et al. |
| 6,861,277 | B1 | 3/2005 | Monroe et al. | 2005/0068605 | A1 | 3/2005 | Tsai |
| 6,862,022 | B2 | 3/2005 | Slupe | 2005/0068606 | A1 | 3/2005 | Tsai |
| 6,862,029 | B1 | 3/2005 | D'Souza et al. | 2005/0069209 | A1 | 3/2005 | Damera-Venkata et al. |
| 6,867,896 | B2 | 3/2005 | Miles | 2005/0078348 | A1 | 4/2005 | Lin |
| 6,870,581 | B2 | 3/2005 | Li et al. | 2005/0168849 | A1 | 8/2005 | Lin |
| 6,870,654 | B2 | 3/2005 | Lin et al. | 2005/0195462 | A1 | 9/2005 | Lin |
| 6,882,458 | B2 | 4/2005 | Lin et al. | 2005/0202649 | A1 | 9/2005 | Hung et al. |
| 6,882,461 | B1 | 4/2005 | Tsai et al. | | | | |
| 6,912,022 | B2 | 6/2005 | Lin et al. | | | | |
| 6,952,303 | B2 | 10/2005 | Lin et al. | | | | |

2005/0249966 A1 11/2005 Tung et al.

FOREIGN PATENT DOCUMENTS

| CH | 6855887 | 10/1995 |
|---|---|---|
| DE | 19525081 | 1/1997 |
| EP | 1065645 | 1/2001 |
| FR | 2516785 | 5/1983 |
| GB | 2030721 | 4/1980 |
| JP | 01259243 | 1/1990 |
| JP | 3002540 A | 1/1991 |
| JP | 11337412 | 3/2000 |
| WO | WO95/030924 | 11/1995 |
| WO | WO97/017628 | 5/1997 |
| WO | WO99/52006 A2 | 10/1999 |
| WO | WO9952006 A3 | 10/1999 |
| WO | WO 01/69320 A1 | 9/2001 |
| WO | WO 02/093116 A1 | 11/2002 |
| WO | WO 03/007049 A1 | 1/2003 |
| WO | WO 03/069413 A1 | 8/2003 |
| WO | WO 03/073151 A1 | 9/2003 |
| WO | WO 2004/006003 A1 | 2/2004 |
| WO | WO 2004/025239 A2 | 3/2004 |
| WO | WO 2004/026757 A2 | 4/2004 |
| WO | WO 2005/001410 A1 | 1/2005 |

OTHER PUBLICATIONS

Jin, et al. "MEMS Vacuum Packaging Technology and Applications" Electronics Packaging Technology, 2003, 5th Conference, Dec. 10-12, 2003, Piscataway, NJ, pp. 301-306.

Tominette, et al, Moisture and Impurities Detection and removal in Packaged MEMS, proceeding of SPIE vol. 4558, (2001), pp. 215-225.

Drieenhuizen, et al., "Comparison of Techniques for measuring Both Compressive and Tensile Stress in Thin Films." *Sensors and Actuators*, vol. 37-38, pp. 759-765. (1993).

Guckel et al., "Fine-Grained Polysilicon Films with Built-In Tensile Strain," *IEEE Transactions on Electron Devices*, vol. 35, No. 6, pp. 801-802, (1988).

"High-reflectivity Specular Reflectance standard," [Online] XP002374849, (URL:http://web.archive.org/web/20040220134330/www.oceanoptics.com/products/stan.ss1.asp> (retrieved on Feb. 20, 2004).

Lin et al., "A Micro Strain Gauge with Mechanical Amplifier," *J. of Microelectromechanical Systems*, vol. 6, No. 4, (1997).

"Low-reflectivity Specular Reflectance Standard," Internet Article, XP002374848 <URL:http://web.archive.org/web/20040220134257/www.oceanoptics.com/Productsstan.ss1.asp> (retrieved on Feb. 20, 2004).

Pruessner et al., "Mechanical Property Measurement of InP-based MEMS for optical communications," *Sensors and Actuators*, vol. 105, pp. 190-200, (2003).

"S2000 Miniature Fiber Optic Spectrometer", Internet Article, XP002358483, pp. 1-2, <URL:http://web.archive.org/web/20040617035842/www.oceanoptics.com/products/s2000.asp> (Retrieved Jun. 17, 2004).

Singh et al., "Strain Studies in LPCVD Polysilicon for Surface Micromachined Devices," *Sensors and Actuators*, vol. 77, pp. 133-138, (1999).

Srikar et al., "A Critical Review of Microscale Mechanical Testing Methods Used in the Design of Microelectrochemical Systems," *Society for Experimental mechanics*, vol. 43, No. 3, (2003).

Zhang, et al., "Measurements of Residual Stresses in Thin Films Using Micro-Rotating-Structures." *Thin Solid Films*, vol. 335, pp. 97-105, (1998).

Akasaka, "Three-Dimensional IC Trends," Proceedings of IEEE, vol. 74, No. 12, pp. 1703-1714 (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface Micromachined Tuneable Interferometer Array," Sensors and Actuators, pp. 17-23 (1994).

Conner, "Hybrid Color Display using Optical Interference Filter Array," SID Digest, pp. 577-580 (1993).

Durr et al., "Reliability Test and Failure Analysis of Optical MEMS", Proceedings of the 9th International Symposium on the Physical and Failure Analysis of Integrated Circuits, pp. 201-206, (Jul. 8-12, 2002).

Goossen et al., "Possible Display Applications of the Silicon Mechanical Anti-Reflection Switch," Society for Information Display (1994).

Goossen et al. "Silicon Modulator Based on Mechanically-Active Anti-Reflection Layer with 1Mbit/sec Capability for Fiber-in-the-Loop Applications," IEEE Photonics Technology Letters (Sep. 1994).

Gosch, "West Germany Grabs the Lead in X-Ray Lithography," Electronics, pp. 78-80 (Feb. 5, 1987).

Harpster Timothy J et al., "A Passive Humidity Monitoring System for In Situ Remote Wireless Testing of Micropackages," J Microelectromech Syst. vol. 11, No. 1, p. 61-67, (2002).

Howard et al., "Nanometer-Scale Fabrication Techniques," VLSI Electronics: Microstructure Science, vol. 5, pp. 145-153 and pp. 166-173 (1982).

Jackson, "Classical Electrodynamics," John Wiley & Sons Inc., pp. 568-573 (date unknown).

Jerman et al., "A Miniature Fabry-Perot Inteferometer with a Corrugated Silicon Diaphragm Support," IEEE Electron Devices Society (1988).

Johnson "Optical Scanners," Microwave Scanning Antennas, vol. 1, pp. 251-261 (1964).

Light over Matter, Circle No. 36 (Jun. 1993).

Miles, "A New Reflective FPD Technology Using Interferometric Modulation," Society for Information Display '97 Digest, Session 7.3.

Miles, "Interferometric Modulation:MOEMS as an Enabling Technology for High-Perfomorance Reflective Displays," Proceedings of the SPIE, vol. 4985, p. 131-139. (2003).

Miles et al., "Digital Paper™ for Reflective Displays," J. of the Society for Information Display Soc. Inf. Display USA. vol. 11, No. 1, p. 209-215. (2003).

Newsbreaks, "Quantum-trench devices might operate at terahertz frequencies," Laser Focus World (May 1993).

Oliner et al., "Radiating Elements and Mutual Coupling," Microwave Scanning Antennas, vol. 2, p. 131-194 (1966).

Raley et al., "A Fabry-Perot Microinterferometer for Visible Wavelengths," IEEE Solid-State Sensor and Actuator Workshop, Hilton Head, SC (1992).

"Reflection/backscattering Probes," Ocean Optics, INC, Internet Article, p. 1-3. XP-002358482. URL:http://web.archive.org/web/20040619022333/www.oceanoptics.com/products/reflectionprobes.asp> retrieved on Jun. 19, 2004.

Roveti, "Choosing a Humidity Sensor: A Review of Three Technologies", http://www.sensorsmag.com/articles/0701/54/main.shtml, (published prior to Sep. 17, 2004).

Skaggs et al, "Automatic Testing of the Digital Micromirror Device", IEEE/LEOS 1996 Summer Topical Meetings, pp. 11-12, (Aug. 5-9, 1996).

Sperger et al., "High Performance Patterned All-Dielectric Interference Colour Filter for Display Applications," SID Digest, pp. 81-83 (1994).

Stone, "Radiation and Optics, An Introduction to the Classical Theory," McGraw-Hill, pp. 340-343 (1963).

Tabata et al., "In Situ Observation and Analysis of Wet Etching Process for Micro Electromechanical systems," Proc. Of the Workshop on Micro Electro Mechanical Systems. vol. Workshop 4. p. 99-102, (1991).

Walker, et al., "Electron-beam-tunable Interference Filter Spatial Light Modulator," Optics Letters vol. 13, No. 5, pp. 345-347 (May 1988).

Waelti M. et al., "Package Quality Testing Using Integrated Pressure Sensor," Proc. Of the SPIE, vol. 3582, p. 981-986, (1998).

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

Austrian Search Report No. 83/2005, mailed on May 9, 2005.

* cited by examiner

ELECTRICAL CHARACTERIZATION OF INTERFEROMETRIC MODULATORS

RELATED APPLICATION

This application claims priority to U.S. Provisional Application No. 60/613,537, filed on Sep. 27, 2004, which is incorporated herein by reference in its entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment includes a method of measuring resistance between conductive leads in a display, comprising applying a controlled voltage across at least two conductive leads in the display, wherein the conductive leads are used for driving display elements within the display and measuring current through the leads in response to the applied voltage.

Another embodiment includes a method of testing an interferometric modulator display, comprising applying a controlled voltage across at least two conductive leads in the display, wherein the conductive leads are used for driving interferometric modulators within the display; measuring current through the leads in response to the voltage; and identifying the display as having electrical characteristics desirable for use as a display based on the measuring.

Another embodiment includes a method of conditioning an interferometric modulator display, comprising applying, prior to use of the display, a voltage waveform to the display, wherein the voltage waveform has an amplitude high enough to actuate at least one interferometric modulator in the display, wherein the voltage waveform is such that it supplies a net zero charge to the interferometric modulators in the display.

Another embodiment includes a method of repairing a short in a display, comprising applying a voltage across at least two conductive leads through which a short has been measured, the voltage sufficient to actuate at least one display element through which the conductive leads pass.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

After manufacture of an interferometric modulator display, it may be desirable to test the display for certain operational characteristics to determine whether the display is suitable for use or to diagnose any inherent manufacturing defects. Characteristics desirable to test include electrical characteristics, such as the resistance of the conductive leads within the display. Measurement of opens through conductive leads indicates a fault with that lead. Measurement of shorts between adjacent conductive leads indicates that the leads are contacting each other or that conductive debris is present between the leads. Thus, disclosed herein are methods and systems for testing the electrical characteristics of interferometric modulator displays.

Figure 1:
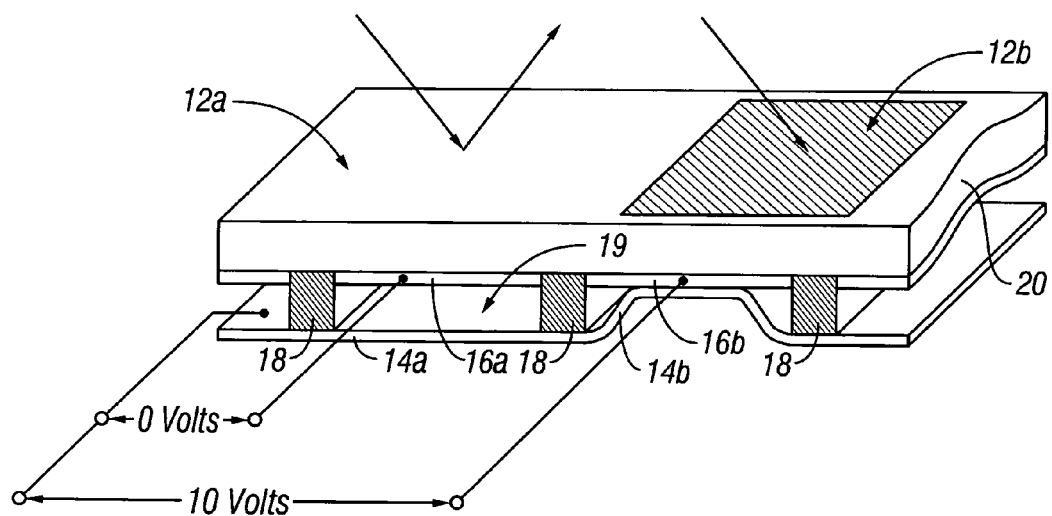
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deform able layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
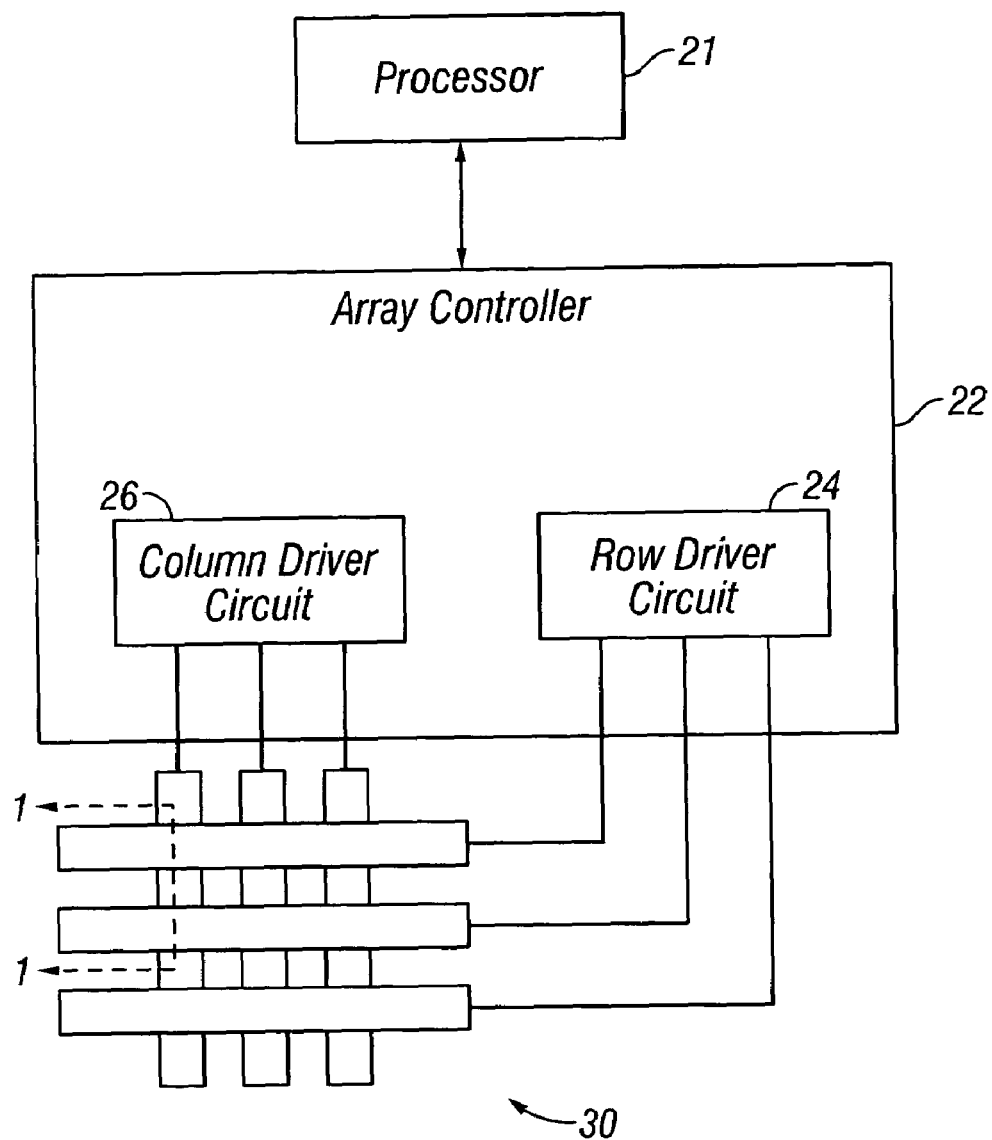
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1—1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3–7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
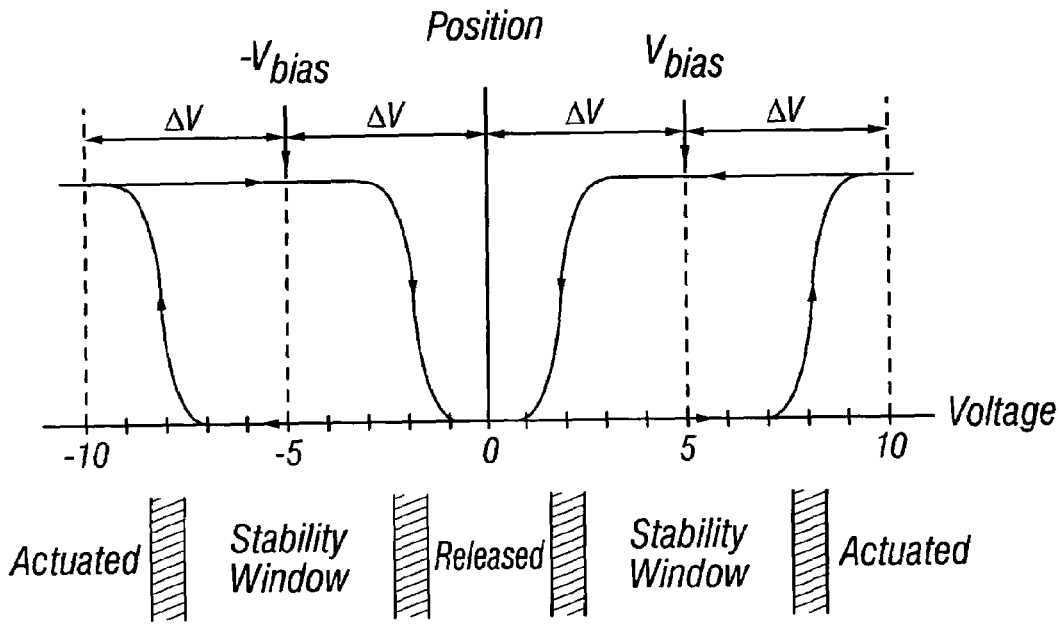
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to +?V, which may correspond to −5 volts and +5 volts respectively Releasing the pixel is accomplished by setting the appropriate column to $+V_{bias}$, and the appropriate row to the same +?V, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to −?V. In this embodiment, releasing the pixel is accomplished by setting the appropriate column to $-V_{bias}$, and the appropriate row to the same −?V, producing a zero volt potential difference across the pixel.

Figure 5A:
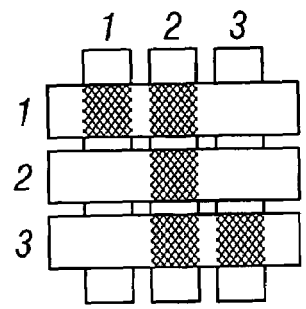
FIGS. 5A and 5B illustrate one exemplary timing diagram for row and column signals that may be used to write a frame of display data to the 3×3 interferometric modulator display of FIG. 2.
Figure 5B:
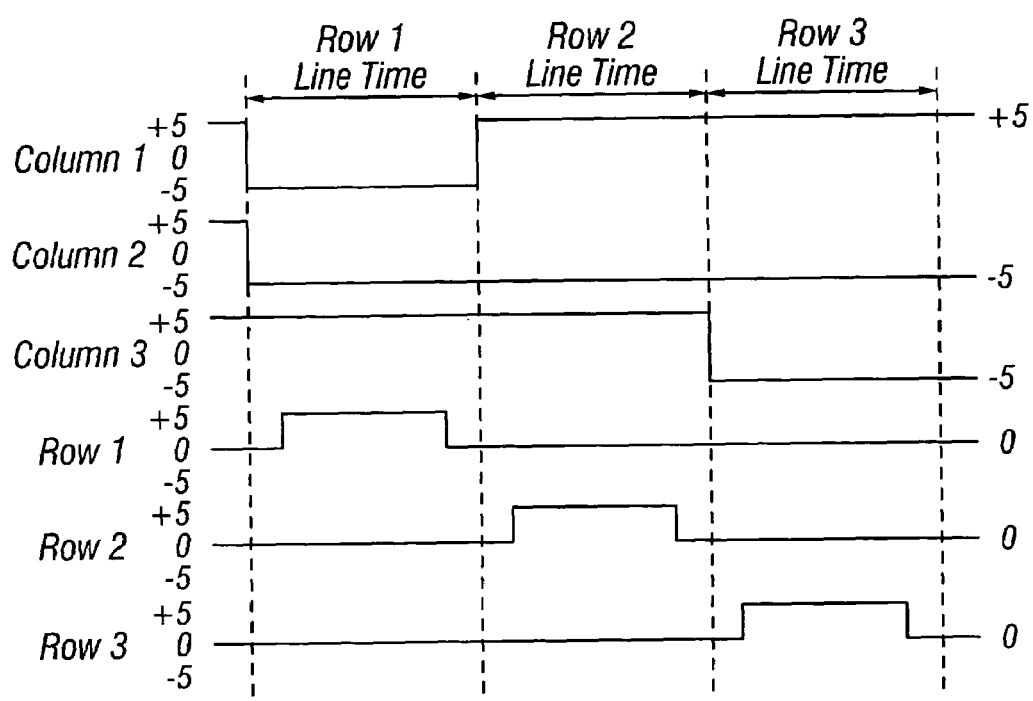

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3–7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
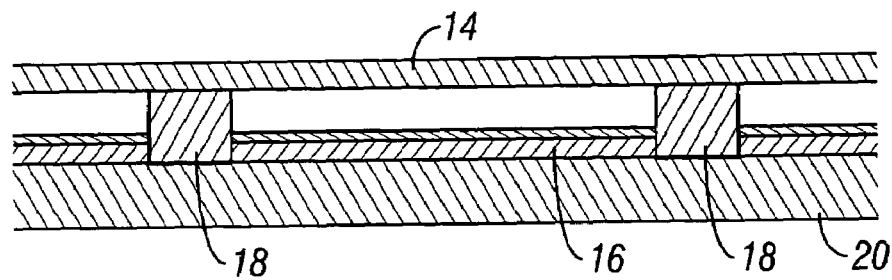
FIG. 6A is a cross section of the device of FIG. 1.
Figure 6B:
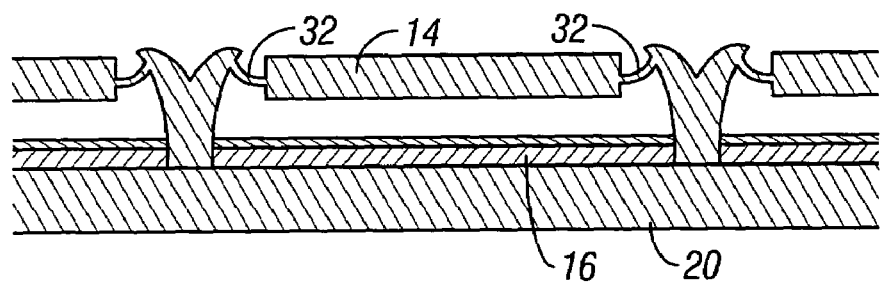
FIG. 6B is a cross section of an alternative embodiment of an interferometric modulator.
Figure 6C:
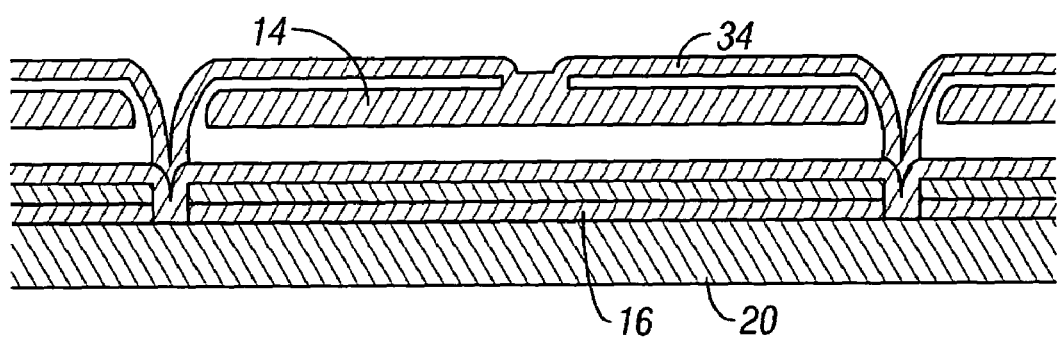
FIG. 6C is a cross section of another alternative embodiment of an interferometric modulator.

The details of the structure of interferometric modulators that operate in accordance with the principles set forth above may vary widely. For example, FIGS. 6A–6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Electrical Characterization

In some embodiments, methods are provided for testing the electrical characteristics of an interferometric modulator display. In some cases, the resistance across conductive leads in the display is measured. Resistance measurements can indicate whether the conductive leads were properly formed during the manufacturing process and whether any debris within the display is altering the electrical characteristics. For example, it is desirable that the resistance through each individual conductive lead (e.g., each row and column conductive lead) be low. A high resistance through an individual conductive lead may be indicative of an open within the lead. It is also desirable that the resistance between adjacent conductive leads be high. For example, a low resistance between a column and a row conductive lead may indicate that a short exists in the interferometric modulator element that is formed at the intersection of the column and row. Similarly, a low resistance between adjacent column or row conductive leads may be indicative of a short between those leads. Shorts may be caused by an error in manufacturing that causes the conductive material to be fused together or by conductive debris between the leads.

Measuring resistance in conductive leads in an interferometric modulator display includes determining the resistance in view of the fact that the electrical characteristics of the display can vary depending on whether the interferometric modulator elements are actuated or not. In typical resistance meters, such as those typically used to test liquid crystal displays, the voltage applied to make the measurement may vary. Accordingly, the voltage may rise to levels sufficient to actuate interferometric modulators within the display, which may result in different measurements from those obtained when the interferometric modulators do not actuate. Thus, in one embodiment, resistance is measured by applying a controlled voltage across the leads and then measuring the resulting current, known as a force voltage/measure current (FVMI) technique, when the interferometric modulators are in a non-actuated state. By applying a controlled voltage, actuation of the interferometric modulators can be controlled. In one embodiment, such resistance measurements may be made using a Keithly 6517 high resistance meter.

Figure 7:
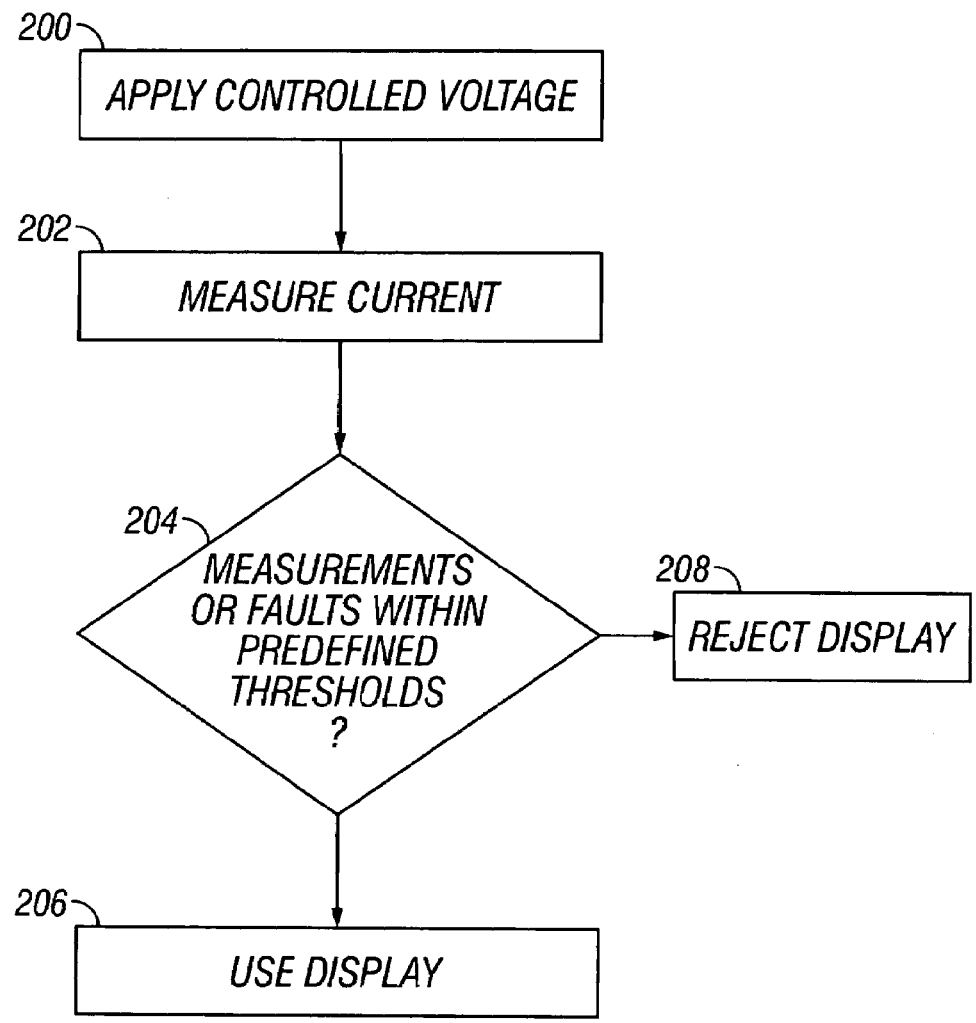
FIG. 7 is a flowchart illustrating a method of measuring the electrical characteristics of a display such as an interferometric modulator display.

FIG. 7 is a flowchart illustrating a method of measuring resistance between conductive leads in a display such as an interferometric modulator display. Depending on the particular embodiment, steps may be added to those depicted in FIG. 7 or some steps may be removed. In addition, the order of steps may be rearranged depending on the application. At step 200, a controlled voltage is applied across at least two conductive leads of the display. In one embodiment, multiple leads are interfaced to external electronics and the leads to which the controlled voltage is applied is determined by the external electronics. For example, all leads in the display could be coupled to external electronics containing relays, which could be used for selectively applying a controlled voltage to less than all leads in the display. In some embodiments, the external electronics can be used to short one or more leads together. In one embodiment when an interferometric modulator is being tested, the applied controlled voltage is kept low enough such that no interferometric modulators actuate. For example, the voltage may be kept within +/1 V. Next, at step 202, the resulting current is measured through the conductive leads, after which resistance may be determined. In one embodiment, resistance is measured through one or more conductive leads, such as through a row or column, by applying a voltage to opposite ends of the rows or columns. Such a measurement allows determination of whether an open exists in the rows or columns. In another embodiment, resistance is measured between a row and a column. Such a measurement allows determination of whether a short exists between the row and column in the interferometric modulator element at the intersection of the row or column. In one embodiment, a resistance of less than 100 MO indicates that unacceptable conduction exists between a row and column. In another embodiment, a resistance of less than 50 MO indicates that unacceptable conduction exists between a row and column. In another embodiment, resistance is measured between adjacent rows and/or columns. Such a measurement allows determination of whether a short exists between the adjacent rows or columns. In one embodiment, a resistance of less than 10 MO indicates that unacceptable conduction exists between adjacent rows or columns. In another embodiment, a resistance of less than 1 MO indicates an unacceptable conduction between adjacent rows or columns.

In some embodiments, resistance measurements may be made on multiple conductive leads simultaneously. For example, resistance may be measured between all adjacent rows simultaneously. If the per lead resistance measured in this way is less than a predefined threshold, then subsequent testing may optionally be used to identify which row-row leads contain a short. Similarly, the resistance of all adjacent column leads may be measured simultaneously or the row-to-column resistance through pixel elements may be measured simultaneously. In some embodiments, the display being tested is a color display. In such cases, the resistance between adjacent leads may include measuring resistance between leads for driving different color subpixels, such as between a lead for red subpixels and a lead for green and/or blue subpixels. Accordingly, in some embodiments, measuring resistance between adjacent column leads may involve three separate measurements—the red-blue leads, blue-green leads, and red-green leads.

In some embodiments, the controlled voltage is a time-varying voltage waveform. For example, in some embodiments, an AC waveform is applied. A time-varying voltage waveform that is symmetric about some constant value may be used to ensure that a net zero charge is supplied to display elements. For example, when applying the voltage to a row and column to measure for shorts through a display element at the row-column intersection, a voltage waveform symmetric about 0 V or an offset voltage (e.g., the voltage required for zero charge in a display element) may be applied to ensure no build up of charge in the display element during testing.

In one embodiment, resistance is measured separately for each polarity. The comparison of resistances measured for opposite polarities may provide a check of quality of the display. For example, in an interferometric modulator display, the driving schemes may involve applying voltages of both polarities as described above. Accordingly, it may be desirable for the electrical characteristics of the display to be similar for both polarities. Furthermore, measuring resistance in both polarities may provide a check to determine whether detected values are due to noise or due to actual resistance. For example, if the resistance is very high, only noise may be measured. If the polarity of the measured current does not change sign upon reversal of the polarity of the applied voltage, there may be indication that only noise is being detected.

The resistance measurement may optionally be used to identify the display as having the electrical characteristics desirable for use as a display. Thus, for example, proceeding to step 204 in FIG. 7, the resistance measurements or number of shorts and/or opens are compared to predefined thresholds. If the measurements or numbers are within the thresholds, then the display may be used as a display by proceeding to step 206. If the measurements or numbers are not within the thresholds, then the display may be deemed defective and discarded at step 208. Such testing may be used for quality control purposes during manufacture of the displays. In some embodiments, a sampling of displays produced during manufacturing is tested to represent the quality of one or more lots of displays.

In other embodiments, resistance measurements may be used to identify errors in manufacturing. For example, resistance measurements may be used to pinpoint locations of manufacturing error. If a pinpointed location of error, such as a short through a single pixel, is repeatedly measured at the same location in different displays, there may be an indication of a manufacturing error. This information may be used to correct defects in equipment or procedure.

In some embodiments, resistance measurements may be used to monitor the results of certain manufacturing processes. For example, resistance measurements may be used to monitor variation in film parameters (e.g., thickness and width dimensions).

In some embodiments, the precise location of a short or open may be determined through a decision tree approach. For example, all leads may be measured at a first level of the decision tree. If the measured resistance indicates that a short exists somewhere in the display, half of the row or column leads may then be tested followed by the other half if the short or open was not detected in the first half. In this way, the location of the fault is narrowed down to half of the display. This process may continue in a similar fashion to narrow down the location of the fault until it is precisely identified through a single row and/or column. In other embodiments, each row and/or column combination may be separately measured to determine the location of faults.

In still other embodiments, bypass structures may be incorporated within a display that enables one or more pixels to be bypassed. Thus, for example, if a resistance measurement indicates a short at one pixel site, that pixel may be bypassed by activating a bypass structure that shunts the conductive row and column leads at the pixel around the pixel site, thus electrically isolating the bad pixel. Accordingly, in one embodiment, resistance measurement procedures such as described herein are used to provide an indication of which pixels or regions of a display to bypass with an appropriate bypass structure.

Electrical Measurement Structures

Figure 8:
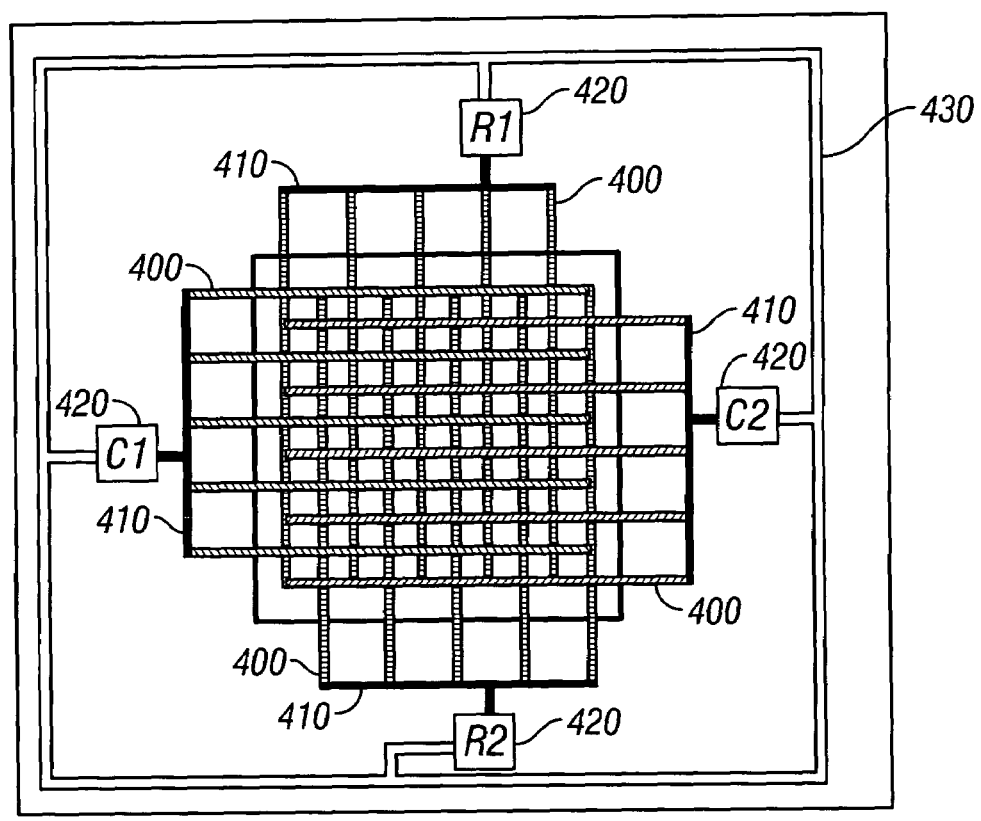
FIG. 8 is an illustration of an interferometric modulator array with buss bars, test pads, and shorting bars.
Figure 9:
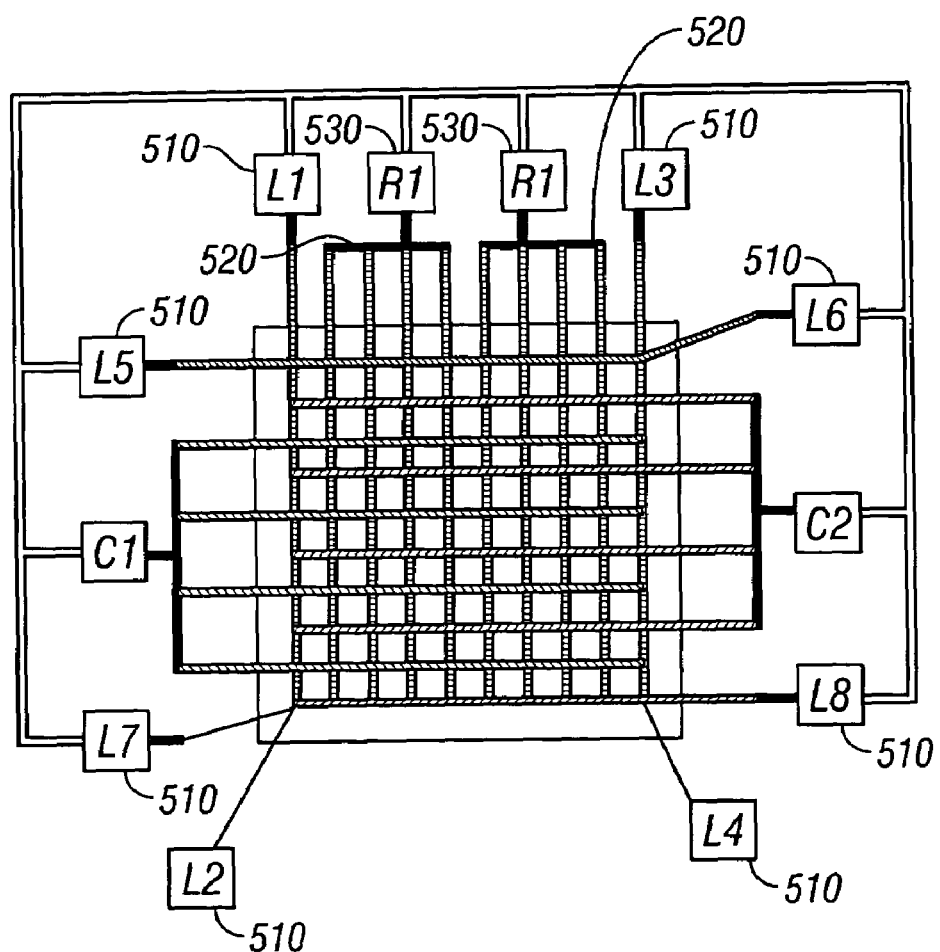
FIG. 9 is another illustration of an interferometric modulator array with buss bars, test pads, and shorting bars.

In some embodiments, appropriate conductive structures are interfaced to an interferometric modulator array during manufacturing in order to facilitate electrical and electro-optical characterization and testing of the array. In one embodiment, depicted in FIG. 8, row and column leads 400 may be connected to one or more buss bars 410, which are then connected to one or more test pads 420. Row and column leads 400 may correspond, for example, to the row and column strips depicted in FIG. 5A. The buss bars 410 electrically connect all the leads connected to the bar and thus facilitate the voltage control of all those leads simultaneously. It may also be desirable that all leads are shorted together during processing by using a shorting bar 430. The shorting bar 430 may be removed prior to electrical and/or electro-optical testing. In one embodiment, alternating row and column leads 400 are connected to the same buss bars 410 (i.e., interdigitated), as depicted in FIG. 8, to allow for measurement of adjacent row-row or column-column resistances as described above. As used herein, a "row" refers to the conducting lines adjacent to the substrate (e.g., lines of transparent conductor). As used herein, a "column" refers to the conducting lines associated with the movable mirrors. In other embodiments, alternative arrangements of shorting bars and test pads may be used. For example, the arrangement in FIG. 9 provides test pads 510 on opposite ends of the same row and column (e.g., test pads L1–L2, L3–L4, L7–L8, and L5–L6). Arrangements of buss bars 520 and test pads 530 may also be used to test different regions of the display separately. When an interferometric modulator display is a color display, buss bars and test pads may be constructed so that the different color subpixels (i.e., interferometric modulators designed to reflect a certain color) can be driven separately. After testing, the buss bars and test pads may be removed so that the active area (interferometric modulator array) can be incorporated into the desired user package. In an alternative embodiment, probes are contacted to each lead separately rather than through test pads. In this embodiment, external electronics may be used to short multiple leads together in order to simultaneously measure resistance through multiple leads. Those of skill in the art will recognize many suitable structures and techniques that can be used to interface an interferometric modulator array to a resistance measuring device.

In one embodiment, structures such as described in FIGS. 8 and 9 are used to measure resistance across single row and/or column lines (e.g., across L1–L2, L3–L4, L7–L8, and L5–L6) individually. A resistance that is too large may indicate a break in the row or column line and thus that at least a portion of the row or column cannot be matrix addressed. In one embodiment, structures such as described in FIGS. 8 and 9 are used to measure row-to-row and/or column-to-column resistance. If the rows and/or columns are interdigitated, then resistance measurement between adjacent rows and/or columns will provide a measurement of current leakage (e.g., measured across R1–R2 or C1–C2 in FIG. 8). In some embodiments, if total row-row or column-column resistance is too low, individual sets of adjacent row-row or column-column resistance may be measured. In one embodiment, row-to-column resistance is measured. This measurement may be made by measuring resistance between all rows shorted and all columns shorted (e.g., between R1 and R2 shorted and C1 and C2 shorted in FIG. 8). Resistance that is too low may indicate a short between a row and a column.

Interferometric Modulator Conditioning

In one embodiment, performance of an interferometric modulator display after manufacture may be improved by preconditioning the display. The preconditioning may be accomplished by applying a voltage to the display sufficient to actuate interferometric modulator elements in the display. Immediately after manufacture, the voltages at which interferometric modulators actuate may vary until a steady state behavior is reached. Thus, preconditioning may stress the movable interferometric modulator elements so that a stable or near stable response is achieved upon actuation. Furthermore, such preconditioning may remove transitory shorts between conductive leads by vaporizing conductive debris. In some embodiments, preconditioning may reveal defects not observed prior to preconditioning. Thus, for example, resistance measurements such as described above may be conducted both before and after preconditioning.

In one embodiment, the preconditioning voltage waveform is applied to substantially all elements in the interferometric modulator display simultaneously. In such a manner, each element may be stressed and conditioned identically so that the display response of each element is similar, reducing the observance of ghosting effects.

In one embodiment, a voltage waveform is applied to the display having an amplitude sufficient to actuate the interferometric modulators. The voltage may be applied to all interferometric modulators simultaneously (e.g., by applying the voltage between R1 and R2 shorted to ground and C1 and C2 shorted to a waveform generator in FIG. 8) or to a subset of the interferometric modulators. In one embodiment, a voltage waveform that is symmetric about some constant value may be used to ensure that a net zero charge is supplied to the display elements. For example, a voltage waveform symmetric about 0 V or an offset voltage (e.g., the voltage required for zero charge in a display element) may be applied to ensure no build up of charge in the display elements.

Figure 10A:
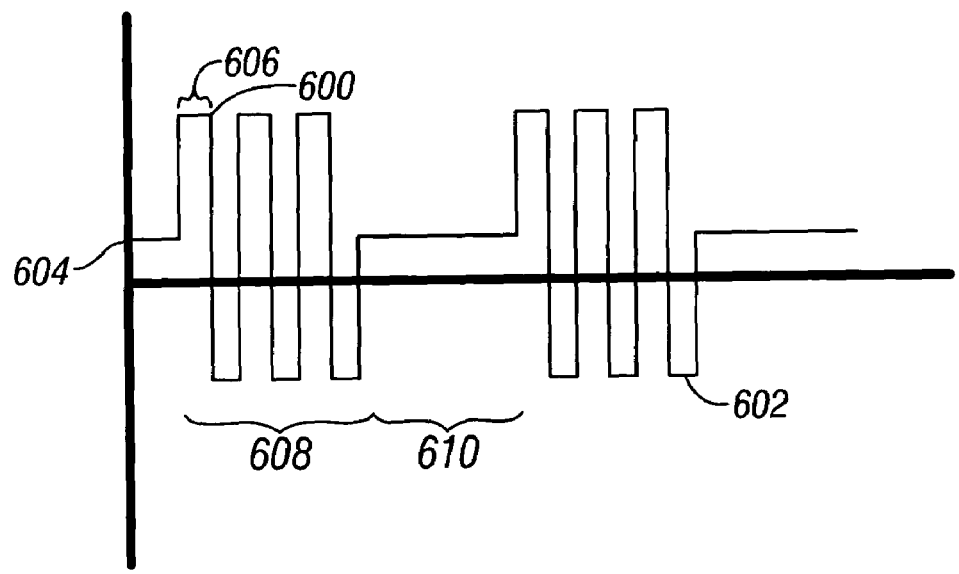
FIG. 10A is a graph illustrating an alternating square voltage waveform for conditioning an interferometric modulator array.

In one embodiment, the voltage waveform includes pulsing of an alternating square waveform. FIG. 10A illustrates one such possible voltage waveform. A series of square waves having amplitudes 600 sufficient to actuate the interferometric modulators may be applied. Thus, when the voltage is at the positive 600 or negative 602 amplitude values, the interferometric modulators are actuated. When the voltage is at the offset potential 604, the interferometric modulators are in a non-actuated state. Each square waveform may have width 606 (e.g., 5 ms) before the polarity of the applied voltage is reversed. A series of such alternating square waveforms may have width 608 (e.g., 0.5 s). After applying this sequence, the voltage may be held at the offset potential 604 for time 610 (e.g., 0.5 s). Thus, the result of the waveform in FIG. 10A is that interferometric modulators will cycle through the sequence of an actuated state for time 608 followed by a non-actuated state for time 610. By making the waveform symmetric about the offset voltage 604 and quickly varying the amplitude between positive and negative polarities when driving the interferometric modulators in an actuated state, no net charge is accumulated in the interferometric modulators. Those of skill in the art will recognize many variations of this waveform. For example, time periods 606, 608, and 610 may be varied to obtain different frequency of actuation pulsing (e.g., by varying times 608 and/or 610) and polarity pulsing (e.g., by varying time 606). In various embodiments, the actuation frequency may be at least about 0.1 Hz., 0.5 Hz, 1 Hz, 10 Hz, 50 Hz, 100 Hz, 500 Hz, or 1 kHz. In various embodiments, the polarity change frequency may be at least about 100 Hz, 1 kHz, 5 kHz, 10 kHz, 50 kHz, 100 kHz, 500 kHz, and 1 MHz. Furthermore, in some embodiments, a single actuation waveform having alternating polarity is applied (e.g., only period 608).

Figure 10B:
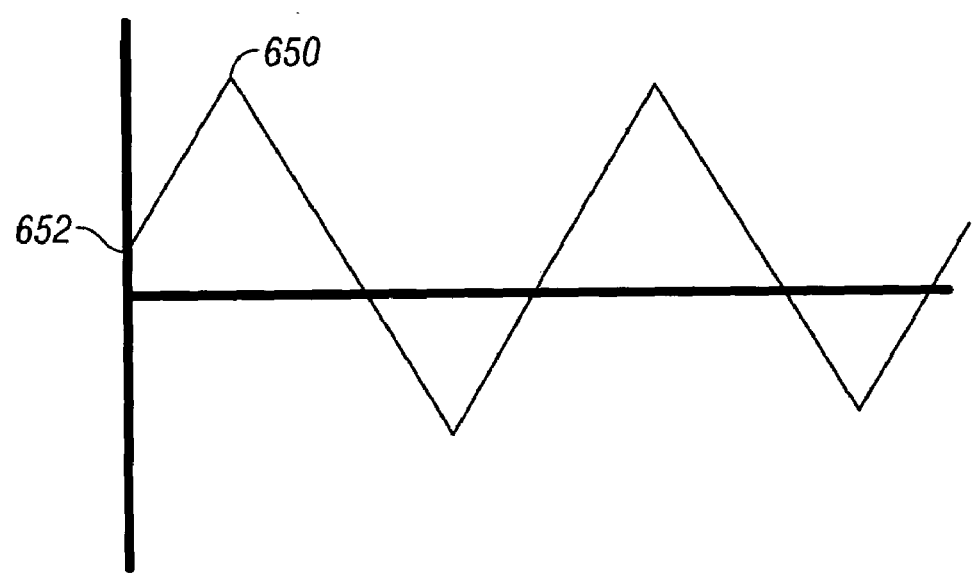
FIG. 10B is a graph illustrating a triangular voltage waveform for conditioning an interferometric modulator array.

In another embodiment, the voltage waveform includes a triangular waveform. FIG. 10B illustrates one such possible waveform. The amplitudes 650 of the triangular waveform are high enough such that the interferometric modulators actuate before the amplitudes are reached. In one embodiment, amplitudes that are about 10% higher than the required actuation voltage are used. The interferometric modulators will de-actuate before the voltage reaches the offset voltage 652 about which the interferometric modulators are centered. In various embodiments, the frequency of the triangle waveform may be at least about 0.1 Hz., 0.5 Hz, 1 Hz, 10 Hz, 50 Hz, 100 Hz, 500 Hz, or 1 kHz.

Those of skill in the art will recognize many possible actuation voltage waveforms that may be used to precondition interferometric modulators. Thus, the disclosure is not limited to only square and triangular waveforms having the characteristics described above.

In some embodiments, different waveforms are combined in series to create a more complex waveform string. For example, the triangle and square waveforms described above may be combined in series. In one embodiment, the triangle waveform is applied for a first time period (e.g., about 1 minute) followed by multiple sequences of square waveforms (e.g., each about 1 minute with increasing amplitudes) followed by a second triangle waveform. This sequence may be repeated any number of times or varied to produce any number of waveform combinations. Those of skill in the art will recognize many other voltage waveforms and combinations of waveforms that may be applied to result in conditioning of the interferometric modulator elements in a display.

In various embodiments, variations in preconditioning voltage waveforms include varying the length of time a particular waveform is applied, varying the frequency of the waveform, and varying the amplitude of the waveform.

In some embodiments, if electrical characterization such as described above indicates that an interferometric modulator display is unsatisfactory, conditioning may be employed to improve the characteristics. For example, conditioning may remove shorts measured during electrical characterization. Thus, in one embodiment, electrical characterization is conducted both before and after conditioning to determine if any faulty characteristics have been corrected by conditioning.

Although the invention has been described with reference to embodiments and examples, it should be understood that numerous and various modifications can be made without departing from the spirit of the invention. Accordingly, the invention is limited only by the following claims.

What is claimed is:

1. A method of testing an interferometric modulator display, comprising measuring resistance between at least two conductive leads in the display using a force voltage/measure current technique, wherein the conductive leads are used for driving display elements within the display and wherein each lead is electrically coupled to an interferometric modulator display element comprising two reflective surfaces, wherein light reflected from the two reflective surfaces interferometrically produce light in the visible spectrum, and wherein voltage applied during the force voltage/measure current technique is below a voltage required to actuate the display elements.

2. The method of claim 1, further comprising identifying a short between the at least two conductive leads based on said measuring.

3. The method of claim 1, further comprising identifying an open between the at least two conductive leads based on said measuring.

4. The method of claim 1, wherein the forced voltage is applied between adjacent rows of conductive leads.

5. The method of claim 1, wherein the forced voltage is applied between adjacent columns of conductive leads.

6. The method of claim 1, wherein the forced voltage is applied between opposite ends of one or more rows or columns of conductive leads.

7. The method of claim 1, wherein the forced voltage is applied between overlapping rows and columns of conductive leads.

8. A method of measuring resistance between conductive leads in a MEMS display, comprising: applying a controlled voltage across at least two conductive leads in the display wherein the conductive leads are used for driving display elements within the display, wherein the applied voltage is lower than a voltage required to actuate the display elements, wherein each lead is electrically coupled to an interferometric modulator display element comprising two reflective surfaces, wherein light reflected from the two reflective surfaces interferometrically produce light in the visible spectrum; measuring current through the leads in response to the applied voltage; and determining resistance based on the measure current.

9. The method of claim 8, wherein the reflective display comprises interferometric modulators.

10. The method of claim 9, wherein the applied voltage is lower than a voltage required to actuate one or more interferometric modulators in the display.

11. The method of claim 10, wherein the applied voltage is a time-varying voltage waveform.

12. The method of claim 11, wherein the time-varying voltage waveform is an sinusoidal voltage waveform.

13. The method of claim 11, wherein the time-varying voltage is such that it supplies a net zero charge to interferometric modulators in the display.

14. The method of claim 8, further comprising identifying a short between the at least two conductive leads based on said measuring.

15. The method of claim 8, further comprising identifying an open between the at least two conductive leads based on said measuring.

16. The method of claim 8, wherein the controlled voltage is applied between adjacent rows of conductive leads.

17. The method of claim 8, wherein the controlled voltage is applied between adjacent columns of conductive leads.

18. The method of claim 8, wherein the controlled voltage is applied between opposite ends of one or more rows or columns of conductive leads.

19. The method of claim 8, wherein the controlled voltage is applied between overlapping rows and columns of conductive leads.

* * * * *

UNITED STATES PATENT AND TRADEMARK OFFICE
CERTIFICATE OF CORRECTION

| | | |
|---|---|---|
| PATENT NO. | : 7,289,256 B2 | Page 1 of 1 |
| APPLICATION NO. | : 11/097511 | |
| DATED | : October 30, 2007 | |
| INVENTOR(S) | : Cummings et al. | |

It is certified that error appears in the above-identified patent and that said Letters Patent is hereby corrected as shown below:

At column 1, line 14, before "URL:" please delete "(" and insert therefore, --<--.

At column 1, line 34, please delete "Microelectrochemical" and insert therefore, --Microelectromechanical--.

At column 1, line 47, please delete "using" and insert therefore, --Using--.

At column 2, line 22, please delete "Inteferometer" and insert therefore, --Interferometer--.

At column 2, line 32, please delete "Perfomorance" and insert therefore, --Performance--.

At column 4, line 14, please delete "deform able" and insert therefore, --deformable--.

At column 5, line 47, after "respectively" please add --.--.

At column 7, line 44, please delete "+/1 V." and insert therefore, --+/- 1V.--.

At column 11, line 28, please delete "Hz.," and insert therefore, --Hz,--.

At column 11, line 45, please delete "Hz.," and insert therefore, --Hz,--.

At column 12, line 48, after "display" please add --,--.

At column 12, line 58, please delete "measure" and insert therefore, --measured--.

Signed and Sealed this

Seventh Day of July, 2009

JOHN DOLL
*Acting Director of the United States Patent and Trademark Office*